United States Patent
Guiu et al.

(10) Patent No.: US 11,432,561 B2
(45) Date of Patent: Sep. 6, 2022

(54) SOLID FERMENTED MILK COMPOSITION

(71) Applicant: Sodima, Boulogne-Billancourt (FR)

(72) Inventors: Paula Guiu, Lyons (FR); Arnaud Mimouni, Lyons (FR)

(73) Assignee: Sodima, Boulogne-Billancourt (FR)

( * ) Notice: Subject to any disclaimer, the term of this patent is extended or adjusted under 35 U.S.C. 154(b) by 0 days.

(21) Appl. No.: 17/047,594

(22) PCT Filed: Jun. 27, 2019

(86) PCT No.: PCT/IB2019/055458
§ 371 (c)(1),
(2) Date: Oct. 14, 2020

(87) PCT Pub. No.: WO2020/003200
PCT Pub. Date: Jan. 2, 2020

(65) Prior Publication Data
US 2021/0145014 A1    May 20, 2021

Related U.S. Application Data

(60) Provisional application No. 62/690,701, filed on Jun. 27, 2018.

(51) Int. Cl.
| | | |
|---|---|---|
| A23C 9/123 | (2006.01) | |
| A23C 9/137 | (2006.01) | |
| A23C 21/02 | (2006.01) | |
| A23C 21/08 | (2006.01) | |

(52) U.S. Cl.
CPC ............ *A23C 9/1232* (2013.01); *A23C 9/137* (2013.01); *A23C 21/026* (2013.01); *A23C 21/08* (2013.01); *A23C 2200/00* (2013.01); *A23C 2220/20* (2013.01); *A23C 2270/05* (2013.01)

(58) Field of Classification Search
CPC ..... A23C 9/1232; A23C 9/137; A23C 21/026; A23C 21/08; A23C 2200/00; A23C 2220/20; A23C 2270/05
USPC ......................................................... 426/43
See application file for complete search history.

(56) References Cited

U.S. PATENT DOCUMENTS

| | | | |
|---|---|---|---|
| 7,250,183 B2 | 7/2007 | Lindstrom et al. | |
| 2010/0143538 A1* | 6/2010 | Bhaskar | A23C 9/123 426/43 |

FOREIGN PATENT DOCUMENTS

| | | | |
|---|---|---|---|
| EP | 0122104 | 10/1984 | |
| WO | WO 2011/130898 | 10/2011 | |
| WO | WO-2011130898 A1 * | 10/2011 | A23L 2/66 |

OTHER PUBLICATIONS

Hugunin, "*U.S. Whey Ingredients in Yogurt and Yogurt Beverages*", U.S. Dairy Export Council, URL: http://www.thinkusadairy.org/Documents/ Customer Site/C3-Using Dairy/C3.7-Respurces and Insights/03-Application and Technology Materials/Yogurt_ENG.pdf, 2016.

(Continued)

*Primary Examiner* — Brent T O'Hern
(74) *Attorney, Agent, or Firm* — Seckel IP, PLLC

(57) ABSTRACT

Fermented milk bases and methods of making fermented milk bases are disclosed. Such fermented milk bases are solid and contain little or no non-dairy stabilizers and non-dairy thickeners. Also disclosed are packaged food products including the disclosed fermented milk bases.

21 Claims, 2 Drawing Sheets

(56) References Cited

OTHER PUBLICATIONS

Mintel, "*Children's Cheese Products*", http://www.gnpd.com, 2000.
Modler et al., "*Physical and Sensory Properties of Yogurt Stabilized with Milk Proteins*", Dairy Science, No. 66, pp. 422-429, 1983.

\* cited by examiner

SOLID FERMENTED MILK COMPOSITION

BACKGROUND

Consumers are increasingly looking for new and interesting eating experiences. As consumers become more aware of the need for more nutritional foods, particularly foods that encourage children to have a healthier diet, while still desiring enjoyable eating experiences, a new challenge has been to produce foods that fulfill both needs. An additional challenge is that consumers expect that such foods also have fewer and simpler ingredients, while maintaining a quality eating experience.

SUMMARY

The present disclosure relates to solid fermented milk compositions having little or no non-dairy stabilizing or non-dairy thickening ingredients.

Provided herein is a fermented milk base. A fermented milk base provided herein includes a fermented milk composition with a protein content of 5% to 10%, where the protein content is 40% to 80% whey protein. A fermented milk base provided herein contains less than 5% non-dairy stabilizers and non-dairy thickeners, and exhibits a stable form for at least 30 days at a temperature of 4° C.

In some embodiments, a fermented milk base provided herein can contain no non-dairy stabilizers and non-dairy thickeners.

In some embodiments, a fermented milk base can exhibit a firmness of at least 1000 g, or at least 1200 g. In some embodiments, a fermented milk base can exhibit a firmness of from about 1000 g to about 2000 g, or from about 1200 g to about 1800 g.

In some embodiments, a fermented milk base provided herein can have at least a portion of the whey protein being a polymerized whey protein. In some embodiments, up to 50%, or up to 40%, of the whey protein is a polymerized whey protein.

In some embodiments, a fermented milk base provided herein can have a protein content that is 50% to 70% whey protein.

In some embodiments, a fermented milk base provided herein can include a live and active lactic acid bacteria culture.

In some embodiments, a fermented milk base provided herein can further include a flavorant, a colorant, a sugar, or a particulate.

Also provided herein are food products that contain a fermented milk base provided herein. A food product can include a fermented milk base which is uncoated and packaged.

In some embodiments, a food product can include a fermented milk base packaged in a plastic tube. In some embodiments, a food product can include a fermented milk base packaged in a push pop container.

A method of making a fermented milk base is also provided herein. A method of making a fermented milk base includes fermenting a dairy composition having a protein content of 5% to 8%, with the protein content being 40% to 80% whey protein, to a pH of less than 5 using lactic acid bacteria to form a fermented dairy composition that contains less than 5% non-dairy stabilizers or non-dairy thickeners, and allowing the fermented dairy composition to set to form the fermented milk base that exhibits a stable form for at least 30 days at a temperature of 4° C.

In some embodiments, a method of making a fermented milk base can include fermenting a dairy composition in a mold. In some embodiments, a method of making a fermented milk base can include allowing the fermented dairy composition to set in a mold.

In some embodiments of a method of making a fermented milk base, a fermented milk base can be allowed to set in a mold that functions as packaging.

In some embodiments of a method of making a fermented milk base provided herein, a dairy composition can be fermented to a pH of less than 4.7.

These and various other features and advantages will be apparent from a reading of the following detailed description.

DETAILED DESCRIPTION

Figure 1:
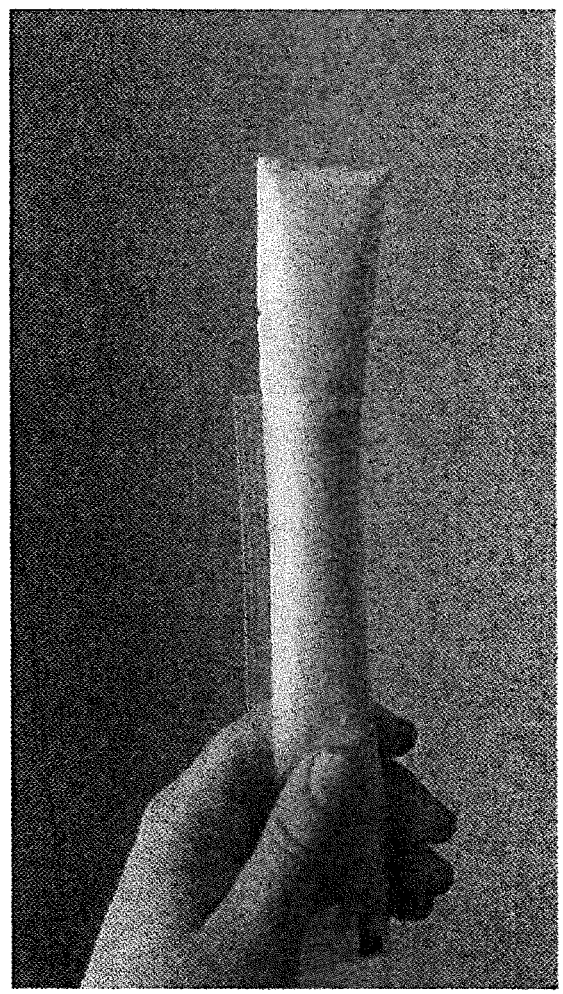
FIG. 1 shows a fermented milk base that was fermented and set in a plastic tube packaging. The packaging can be opened, as shown, and the fermented milk base pushed out from the bottom of the packaging.
Figure 2:
FIG. 2 shows a fermented milk base that was set in a mold and then removed from the mold.

Fermented milk products include a variety of fermented foods, such as yogurt, kefir, concentrated fermented milks, and fermented milk drinks. In many countries, fermented milk has a standard of identity. The Food and Agriculture Organization of the United Nations describes fermented milk in the Codex Standard 243-2003. Although several ingredients are allowable in fermented milk while maintaining standard of identity, consumers are increasingly looking for simplicity in the foods they eat. One challenge is to provide unique eating experiences while also limiting the types of ingredients that are included in new foods.

While developing a fermented milk product that can be eaten in solid form, and removing most or all non-dairy stabilizers and thickeners, it was discovered, and is disclosed herein, that the native protein content in milk can be adjusted to provide a solid fermented milk base that exhibits a stable form while maintaining a creamy mouthfeel. Although milk proteins had been previously tested as stabilizers in yogurt, as described in Modler ((1984) "Physical and Sensory Properties of Yogurt Stabilized with Milk Proteins", J. Dairy Sci., 66:422-429), the resulting yogurts were still spoonable rather than solid, and yogurts stabilized with whey proteins were prone to excessive syneresis. However, as disclosed herein, it was discovered that by increasing both the milk protein content and the proportion of whey protein, a fermented milk base can provide a unique eating experience while reducing or excluding non-dairy stabilizers or non-dairy thickeners.

As used herein, the term "stable form" refers to a solid state that does not change appreciably in form or eating qualities over time. A fermented milk base provided herein can exhibit a stable form for at least 30 days at a temperature of 4° C. That is, although a fermented milk base provided herein is generally packaged to maintain quality and freshness during storage, it can be removed from its packaging and hold a solid, molded shape for at least 30 days at 4° C. in the absence of a support structure, such as a coating, a capsule, or packaging.

Fermented Milk Base

A fermented milk base (e.g., a yogurt, a concentrated fermented milk, a flavored fermented milk, or the like) is provided herein. Preferably, the fermented milk base is free from non-dairy stabilizers and non-dairy thickeners, such as starch, gelatin, pectin, gums, fibers and the like. In some embodiments, a fermented milk base provided herein includes a small amount of one or more non-dairy stabilizer or non-dairy thickener, such as starch, pectin, or a gum. Preferably, a fermented milk base provided herein does not include gelatin.

One or more non-dairy stabilizer or non-dairy thickener can be added in an amount of up to 5% (e.g., less than 4%, or less than 2.5%) by weight of a fermented milk base. In some embodiments, a combination of one or more non-dairy stabilizer and one or more non-dairy thickener can be added in an amount of up to 5% (e.g., less than 4%, or less than 2.5%). It is preferred that any single non-dairy stabilizer or non-dairy thickener ingredient be included in an amount of 2.5% or less (e.g., less than 2%, or less than 1%) by weight of a fermented milk base. Suitable non-dairy stabilizers and non-dairy thickeners includes, but are not limited to, unmodified or modified starch (e.g., corn starch, tapioca starch, rice starch, and the like), gums (e.g., guar gum, xanthan gum, carob bean gum, gum Arabic, gellan gum, konjac gum, carrageenan, and the like), fibers (e.g., inulin, citrus fiber, and the like), or other stabilizers or thickeners, such as pectin, agar, and the like.

A fermented milk base provided herein contains a protein content of greater than 4% by weight (e.g., about 5% to about 15%, or about 6% to about 8%). In addition, a fermented milk base provided herein includes whey protein in an amount of at least 40% (e.g., from 50% to about 80%, or from about 50% to about 70%) of the total protein content by weight. Once set, a fermented milk base provided herein has a benefit of being able to maintain a stable form in the absence of a support structure. An additional benefit is that the surface of a fermented milk base provided herein tends to have a slippery surface, which lubricates the fermented milk base for easy removal from packaging. In some embodiments, particularly where a slippery surface is not preferred, a non-dairy stabilizer and/or non-dairy thickener can be included to provide a dryer surface.

Whey protein in a fermented milk base provided herein can be from any appropriate source, such as liquid milk (e.g., skim milk, whole milk, concentrated milk, or the like), milk protein concentrate, cream, dry milk (e.g., non-fat dry milk), acid whey, sweet whey, whey protein concentrate, or whey protein isolate, or any combination thereof. In some embodiments, at least a portion of the whey protein in a fermented milk base provided herein can be polymerized whey protein. Whey protein can be polymerized using any known method, such as heating a whey protein to a temperature of at least 70° C. Up to about 50% (e.g., up to 40%, or up to 30%) of the whey protein included in a fermented milk base provided herein can be a polymerized whey protein.

Once set (i.e., formed a gel after reaching a pH of less than 5), a fermented milk base provided herein can exhibit a smooth, creamy mouthfeel when chewed. In some embodiments, a fermented milk base can exhibit significant flexibility and slight brittleness. Texture can vary depending on the size and/or shape of the set fermented milk base. However, texture attributes (e.g., firmness) of a fermented milk base provided herein can be measured using standard protocols described below.

A fermented milk base provided herein can have a firmness of at least 1000 g (e.g., at least 1200 g, or at least 1400 g) as measured at 7 days post fermentation using a TA.XTplus texture analyzer (Stable Micro Systems, Surrey, United Kingdom) using Exponent software. In some embodiments, a fermented milk base provided herein has a firmness of from about 1000 g to about 2000 g (e.g., from about 1200 g to about 1800 g). As used herein, firmness is measured on 125 ml of a fermented milk base that has set in a 165 ml container having 59.5 mm diameter opening that tapers to 51 mm diameter at the base, and a 70.8 mm height (RPC Bebo catalog #154 125; RPC Bebo Food Packaging, Montataire Cedex, France). As used herein, firmness is measured as the peak force in grams from a penetration test using a 25 mm diameter cylindrical probe that has a 40 mm height and a flat base penetrating the fermented milk base at a rate of penetration of 5 mm/s to a depth of 30 mm. In comparison, using the described protocol for measuring firmness, commercially available yogurts generally have a firmness of 150 to 200 g.

In some embodiments, a fermented milk base provided herein can include a live and active lactic acid bacteria culture. A live and active bacteria culture can include any appropriate lactic acid bacteria, such as one or a combination of *Streptococcus thermophilus* and *Lactobacillus delbrueckii* subspecies *bulgaricus*. In addition, or alternatively, a live and active bacterial culture can include *Lactobacillus* species (e.g., *Lactobacillus lactis, Lactobacillus acidophilus*), *Lactococcus* species (e.g., *Lactococcus lactis, Lactococcus lactis* subsp. *lactis* biovar. *diacetyllactis, Lactococcus lactis* subsp. *cremoris*), *Streptococcus* species (e.g., *Streptococcus salivarius* subsp. *thermophilus, Streptococcus lactis* var. *bollandicus, Streptococcus taette*), *Bifidobacterium* species (e.g., *Bifidobacterium lactis*), and the like, and combinations thereof. In some embodiments, a fermented milk base provided herein includes at least $1 \times 10^7$ colony forming units (cfu) per gram of fermented milk base.

In some embodiments, a fermented milk base can include up to 15% (e.g., up to 10%, up to 8%, or up to 6%) by weight of a fat.

In some embodiments, a fermented milk base provided herein can include one or more additional ingredient, such as a sugar, a flavorant, a colorant, or any combination thereof, to achieve a desired flavor or appearance. For example, a sugar can be included in a fermented milk base provided herein in an amount of up to 15% by weight of the fermented milk base. In another example, a flavorant and/or a colorant (e.g., a fruit or vegetable juice, a flavor extract, a fruit or vegetable puree, a spice, or the like) in an amount of up to 30% by weight of the fermented milk base. In some embodiments, a particulate (e.g., fruit or nut pieces, seeds, confectionary pieces, or the like) can be included in a fermented milk base provided herein. In some embodiments, a fermented milk base provided herein includes no more than 50% by weight of non-dairy ingredients.

Methods of Making a Fermented Milk Base

Methods of making a fermented milk base are provided herein. A method of making a fermented milk base generally includes fermenting a dairy composition having a protein content of greater than 4% by weight (e.g., about 5% to about 10%, or about 6% to about 8%), the protein content being at least 50% (e.g., from 50% to about 80%, or from about 50% to about 70%) whey protein, to a pH of less than 5 (e.g., less than 4.65) using lactic acid bacteria, then allowing the fermented dairy composition to set to form the fermented milk base.

A dairy composition suitable for fermentation in a method provided herein can be produced by combining dairy-based ingredients, water, and any other ingredients (e.g., sugar, colorants, flavorants, sugar, and the like) to achieve the desired protein content and whey protein content. For example, dairy-based ingredients, such as liquid milk, milk protein concentrate, cream, dry milk, a whey protein source (e.g., whey protein concentrate, whey protein isolate, sweet whey, acid whey, or the like), or any combination thereof, can be used in a dairy composition suitable for fermentation.

In some embodiments, whey protein can be added as a solution to a dairy composition to be fermented. For example, whey protein can be included in a dairy composition to be fermented as a solution having a whey protein concentration of from about 5% to about 10% (e.g., about 7% to about 8%) by weight.

In some embodiments, whey protein can be treated to polymerize the whey protein. For example, a whey protein solution can be thermally treated at a temperature of at least 70° C. for sufficient time to achieve polymerization of the whey protein. For example, a whey protein solution can be thermally treated at about 80° C. for 15 minutes, or at about 95° C. for 6 minutes. In some embodiments, whey protein can be polymerized prior to being added to a dairy composition to be fermented. For example, a whey protein solution can be thermally treated prior to being added to a dairy composition to be fermented. In some embodiments, a dairy composition to be fermented can be thermally treated to polymerize whey protein in the dairy composition. For example, whey protein in a dairy composition to be fermented can be polymerized during pasteurization of the dairy composition.

A dairy composition to be fermented can be pasteurized prior to inoculation with lactic acid bacteria. Any appropriate pasteurization protocol can be used. For example, a dairy composition can be pasteurized at about 95° C. for about 6 minutes. It is to be understood that pasteurization times and temperatures can be adjusted and still achieve pasteurization, as known in the art.

A dairy composition can be inoculated with any appropriate lactic acid bacteria culture or combination of cultures. In some embodiments, a dairy composition is inoculated with a combination of *Streptococcus thermophilus* and *Lactobacillus delbrueckii* subspecies *bulgaricus*. In some embodiments, however, additional bacteria strains or alternative bacterial strains can be used to achieve the desired fermentation time and characteristics. Examples of other suitable lactic acid bacteria that can be used include, without limitation *Lactobacillus* species (e.g., *Lactobacillus lactis*, *Lactobacillus acidophilus*), *Lactococcus* species (e.g., *Lactococcus lactis*, *Lactococcus lactis* subsp. *lactis* biovar. *diacetyllactis*, *Lactococcus lactis* subsp. *cremoris*), *Streptococcus* species (e.g., *Streptococcus salivarius* subsp. *thermophilus*, *Streptococcus lactis* var. *bollandicus*, *Streptococcus taette*), *Bifidobacterium* species (e.g., *Bifidobacterium lactis*), and the like, and combinations thereof.

A dairy composition can be fermented to a pH of less than 5 (e.g., less than 4.7, less than 4.6, or about 4.55) to produce a fermented milk base provided herein.

Generally, it is preferred that all the ingredients desired in the finished fermented milk base are included in a dairy composition prior to fermentation. Since fermentation of a dairy composition according to the present disclosure results in a solid fermented milk, it is preferred that a dairy composition be deposited into a mold to complete part or all of its fermentation. In some embodiments, a mold can also serve as packaging for a fermented milk base provided herein. In other embodiments, a fermented milk base can be allowed to set in a mold and then be transferred to packaging.

Packaged Food Products

Packaged food products containing a fermented milk base are provided herein. Any appropriate packaging can be used. Particularly preferred are packages that allow a consumer to partially or fully remove a fermented milk base for consumption. For example, a fermented milk base can be packaged in plastic tubes that can be torn or peeled open. In another example, a fermented milk base can be packaged in a push pop container, such that the fermented milk base can be pushed upward from an opening using a plunger at the base of the container.

A fermented milk base can be packaged in a single serving or as multiple servings.

In some embodiments, a fermented milk base can be packaged with another food composition, such as a sauce (e.g., chocolate sauce, caramel sauce, fruit sauce, and the like), fruit pieces, confections, nuts, or other edible compositions. For example, a fermented milk base can be packaged with a sauce that is intended to be used to dip the fermented milk base into prior to consumption.

The following examples illustrate particular embodiments and are not intended to limit the claimed invention.

EXAMPLES

Example 1—Solid Yogurt

Dairy compositions were produced using dairy ingredients and a whey protein concentrate (80% by weight whey protein) according to Table 1.

TABLE 1

| Sample | % protein | % whey (by weight protein) | % fat |
|---|---|---|---|
| 1 | 5 | 20 | 5 |
| 2 | 5 | 40 | 5 |
| 3 | 6 | 20 | 5 |
| 4 | 5 | 50 | 5 |
| 5 | 6.5 | 60 | 5 |
| 6 | 8 | 70 | 5 |

Each dairy composition in Table 1 was pasteurized and homogenized at 250 bars, then inoculated with *Streptococcus thermophilus* and *Lactobacillus delbrueckii* subspecies *bulgaricus*. The dairy compositions were incubated at 43° C. for about 7 hours until the pH reached 4.55. The resulting yogurts are described in Table 2.

TABLE 2

| Sample | Firmness at 7 days post fermentation | "In hand attributes" | "In mouth attributes" |
|---|---|---|---|
| 1 | 490 | Too sticky, sticks to mold; not solid enough to hold by hand | Melts in the mouth; smooth, fondant-like texture |
| 2 | 565 | Not firm enough to hold by hand; less sticky than sample 1; jelly-like texture | Smooth, fondant-like texture; yogurt taste with no off-notes |
| 3 | 661 | Not firm enough to hold by hand; cannot be removed from mold | Sticky, pasty in the mouth; grainy |
| 4 | 850 | Smooth and shiny; jelly-like, firm texture; can be removed from the mold; sticks to fingers; clammy to the touch | Clean yogurt taste; melts in the mouth; smooth |
| 5 | 1227 | Firm enough to be | Clean yogurt taste; |

TABLE 2-continued

| Sample | Firmness at 7 days post fermentation | "In hand attributes" | "In mouth attributes" |
|---|---|---|---|
| | | held by hand; smooth, shiny surface; moist/clammy to the touch | melts in the mouth; smooth |
| 6 | 1857 | Firm enough to be held by hand; smooth, shiny surface; moist/clammy to the touch | Sandy, grain, powdery mouthfeel; pasty |

Example 2—Whey Polymerization

Dairy compositions were made using a polymerized whey according to Table 2. Whey proteins were polymerized by heating a 7.5% whey protein solution to 80° C. and holding the temperature at 80° C. for 15 minutes. The whey protein solution was cooled prior to combining with the remaining ingredients.

TABLE 3

| Sample | % protein | % whey (by weight protein) | % fat |
|---|---|---|---|
| 1 | 5 | 50 | 5 |
| 2 | 6.5 | 60 | 5 |

The dairy compositions in Table 2 were pasteurized, homogenized, inoculated, and incubated according to the method in Example 1. The resulting yogurts are described in Table 4.

TABLE 4

| Sample | Firmness at 7 days post fermentation | "In hand attributes" | "In mouth attributes" |
|---|---|---|---|
| 1 | 1337 | Very easy to remove from mold; firm texture with strong gel, firm enough to be held in the hand | Crumbly; breaks into large pieces; boiled egg-like mouthfeel |
| 2 | 2578 | Firm enough to be held in the hand; strong gel; slightly clammy to the touch | Crumbly; boiled egg-like mouthfeel; strong gelled texture |

Comparing samples 4 and 5 from Example 1 to the samples with polymerized whey protein in this Example indicate that whey protein polymerization can be used to increase firmness, but also increase crumbly texture in the mouth. In a separate experiment, 50% of the polymerized whey protein was replaced with non-polymerized whey protein. The resulting product was less crumbly than samples 1 and 2 in this Example, and firmer than samples containing no polymerized whey protein.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A fermented milk base, comprising:
   a. a fermented milk composition; and
   b. a protein content of in a range of from 6% to 10% by weight, the protein content being in a range of from 40% to 80% by weight whey protein;
   the fermented milk base having less than 5% by weight non-dairy stabilizers and non-dairy thickeners, and exhibiting a stable form for at least 30 days at a temperature of 4° C., wherein the fermented milk base has a solid shape and is capable of substantially maintaining the solid shape without requiring a support structure for at least 30 days at a temperature of 4° C.

2. The fermented milk base of claim 1, wherein the fermented milk base contains no non-dairy stabilizers and non-dairy thickeners.

3. The fermented milk base of claim 1, wherein the fermented milk base exhibits a firmness of at least 1000 g.

4. The fermented milk base of claim 1, wherein at least a portion of the whey protein is a polymerized whey protein.

5. The fermented milk base of claim 1, wherein more than 0% by weight and up to 50% by weight of the whey protein is a polymerized whey protein.

6. The fermented milk base of claim 1, wherein the protein content is in a range of from 50% to 70% by weight whey protein.

7. The fermented milk base of claim 1, wherein the fermented milk base includes a live and active lactic acid bacteria culture.

8. The fermented milk base of claim 1, further comprising a flavorant, a colorant, a sugar, or a particulate.

9. A food product, comprising the fermented milk base of claim 1, the fermented milk base being uncoated and packaged.

10. The food product of claim 9, wherein the package is a plastic tube.

11. The food product of claim 9, wherein the package is a push pop container.

12. A method of making a fermented milk base, comprising:
   a. fermenting a dairy composition having a protein content of in a range of from 6% to 8% by weight, the protein content being in a range of from 40% to 80% by weight whey protein, to a pH of less than 5 using lactic acid bacteria to form a fermented dairy composition that contains less than 5% by weight non-dairy stabilizers or non-dairy thickeners, and
   b. allowing the fermented dairy composition to set to form the fermented milk base of claim 1.

13. The method of claim 12, wherein the fermented dairy composition is fermented and allowed to set in a mold.

14. The method of claim 13, wherein the mold functions as packaging.

15. The method of claim 12, wherein the dairy composition is fermented to a pH of less than 4.7.

16. The method of claim 12, wherein the fermented milk base contains no nondairy stabilizers and non-dairy thickeners.

17. The method of claim 12, wherein the fermented milk base exhibits a firmness of at least 1000 g.

18. The method of claim 12, wherein at least a portion of the whey protein is a polymerized whey protein.

19. The method of claim 18, wherein up to 50% by weight of the whey protein is a polymerized whey protein.

20. The method of claim 12, wherein the protein content is in a range of from 50% to 70% by weight whey protein.

21. The fermented milk base of claim 1, wherein the protein content is in a range of from 6% to 8% by weight, the protein content being in a range of from 50% to 70% by weight whey protein.

* * * * *